US012501122B2

(12) United States Patent
Nakano (10) Patent No.: US 12,501,122 B2
(45) Date of Patent: Dec. 16, 2025

(54) APPEARANCE DETERMINATION DEVICE AND APPEARANCE DETERMINATION METHOD (71) Applicant: SINTOKOGIO, LTD., Nagoya (JP)

(72) Inventor: Yoshinari Nakano, Nagoya (JP)

(73) Assignee: SINTOKOGIO, LTD., Aichi (JP)

( * ) Notice: Subject to any disclaimer, the term of this patent is extended or adjusted under 35 U.S.C. 154(b) by 230 days.

(21) Appl. No.: 18/343,171

(22) Filed: Jun. 28, 2023

(65) Prior Publication Data

US 2024/0007725 A1 Jan. 4, 2024

(30) Foreign Application Priority Data

Jul. 4, 2022 (JP) .................. 2022-107804

(51) Int. Cl.
H04N 23/10 (2023.01)
G06T 7/00 (2017.01)
G06T 7/70 (2017.01)
H04N 23/56 (2023.01)

(52) U.S. Cl.
CPC .......... *H04N 23/10* (2023.01); *G06T 7/0004* (2013.01); *G06T 7/70* (2017.01); *H04N 23/56* (2023.01); *G06T 2207/10012* (2013.01); *G06T 2207/10024* (2013.01); *G06T 2207/20084* (2013.01); *G06T 2207/20212* (2013.01); *G06T 2207/30116* (2013.01)

(58) Field of Classification Search
CPC ...... H04N 23/10; H04N 23/56; G06T 7/0004; G06T 7/70; G06T 2207/10012; G06T 2207/10024; G06T 2207/20084; G06T 2207/20212; G06T 2207/30116; G06T 7/586; G06T 7/90; G01N 21/88; G01N 21/01

See application file for complete search history.

(56) References Cited

U.S. PATENT DOCUMENTS 10,417,524 B2 * 9/2019 Feng .................. G06F 18/2155
2017/0155883 A1 * 6/2017 Kusumi ............... H04N 13/204

OTHER PUBLICATIONS

Ikeda (NPL: "Color Photometric Stereo for Albedo and Shape Reconstruction," IEEE 2008) (Year: 2008).*
Saiz (NPL: "Photometric Stereo-based defect detection . . . " MDPI, Jan. 2022) (Year: 2022).*
H. Hayakawa, "Photometric stereo under a light source with arbitrary motion", Journal of the Optical Society of America A, 11(11), p. 3079-3089, 1994.

* cited by examiner

*Primary Examiner* — Shadan E Haghani
(74) *Attorney, Agent, or Firm* — Harness, Dickey & Pierce, P.L.C.

(57) ABSTRACT

An appearance determination device includes at least one processor. The at least one processor carries out a determination step of determining whether an object of determination is conforming or nonconforming, in accordance with a color image and a shape image, the color image being generated by photometric stereo and representing a color optical image of the object of determination, the shape image being generated by the photometric stereo and representing a shape of the object of determination.

9 Claims, 9 Drawing Sheets

APPEARANCE DETERMINATION DEVICE AND APPEARANCE DETERMINATION METHOD

This Nonprovisional application claims priority under 35 U.S.C. § 119 on Patent Application No. 2022-107804 filed in Japan on Jul. 4, 2022, the entire contents of which are hereby incorporated by reference.

TECHNICAL FIELD

The present invention relates to an appearance determination device and an appearance determination method.

BACKGROUND ART

Photometric stereo is a technique for analyzing the appearance of an article with use of a plurality of light sources of different orientations (see, for example, Non-Patent Literatures 1 and 2).

CITATION LIST

Non-Patent Literature

Non-patent Literature 1

R. J. Woodham, Photometric Stereo: A Reflectance Map Technique for Determining Surface Orientation from Image Intensity. Proc. SPIE, vol. 155, pp. 136-143, 1978.

Non-patent Literature 2

H. Hayakawa. Photometric stereo under a light source with arbitrary motion. Journal of the Optical Society of America A, 11(11), 1994.

SUMMARY OF INVENTION

Technical Problem

Photometric stereo is typically used for monochrome grayscale images, and is not intended to be applied to color images. Therefore, in typical photometric stereo, information on color (dependence of reflection of light from the article on the wavelength of the light), which is important in determining whether the appearance of the article is conforming or nonconforming, is discarded.

An object of the present invention is to provide an appearance determination device and an appearance determination method that use color photometric stereo to determine whether the appearance of an object of determination is conforming or nonconforming.

Solution to Problem

In order for the above object to be achieved, an appearance determination device in accordance with an aspect of the present invention includes at least one processor, the at least one processor carrying out a determination step of determining whether an object of determination is conforming or nonconforming, in accordance with at least one selected from the group consisting of a color image and a shape image, the color image being generated by photometric stereo and representing a color optical image of the object of determination, the shape image being generated by the photometric stereo and representing a shape of the object of determination.

Advantageous Effects of Invention

With an aspect of the present invention, it is possible to provide an appearance determination device and an appearance determination method that use color photometric stereo to determine whether the appearance of an object of determination is conforming or nonconforming.

DESCRIPTION OF EMBODIMENTS

Figure 1:
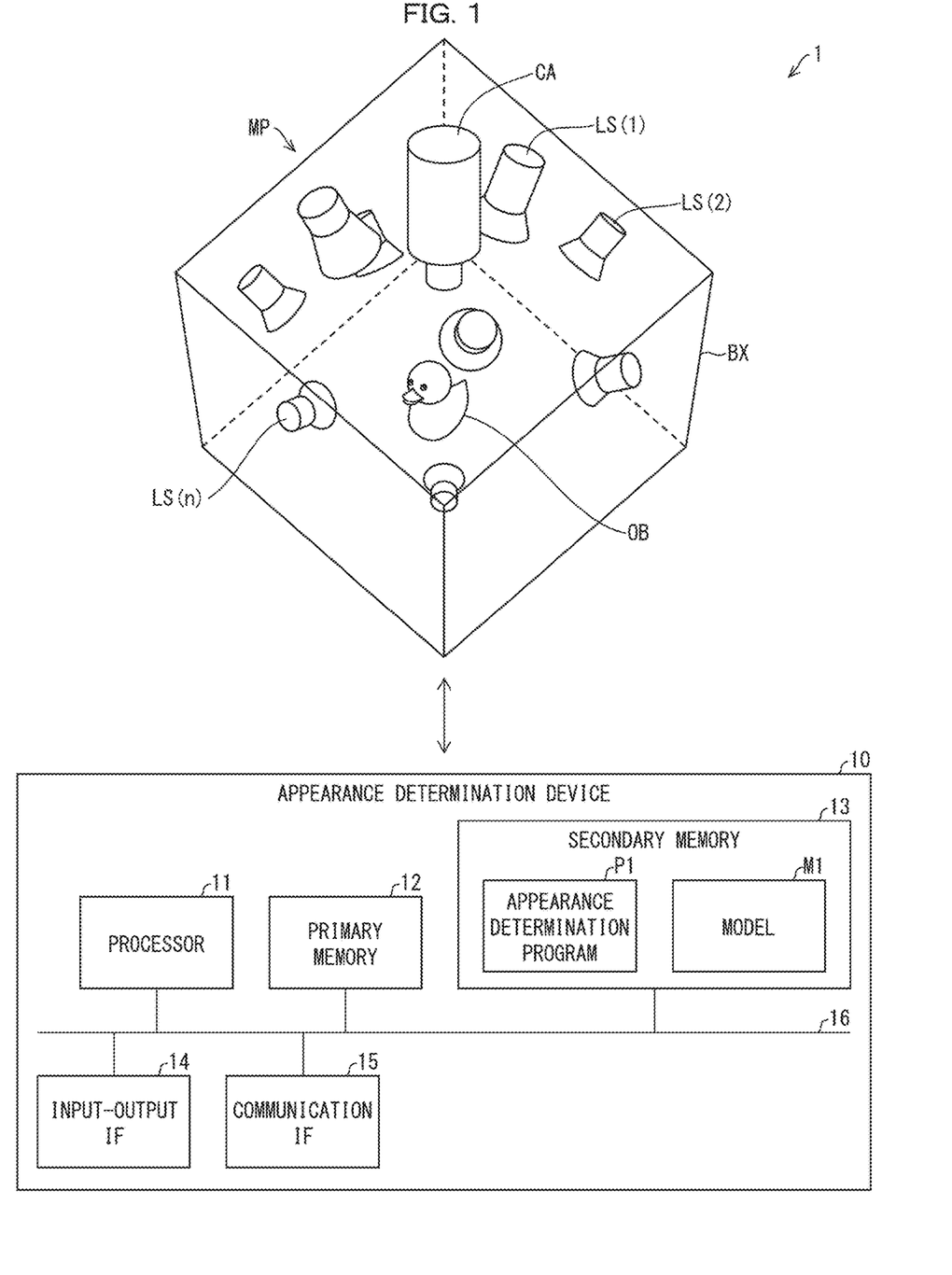
FIG. 1 is a view of a configuration of an appearance determination system in accordance with an embodiment of the present invention.

The following description will discuss an embodiment of the present invention in detail. FIG. 1 is a view of a configuration of an appearance determination system 1 in accordance with an embodiment of the present invention. The appearance determination system 1 is a system for determining whether an object OB of appearance determination is a conforming item (a non-defective item), and includes an image-taking section MP and an appearance determination device 10.

The image-taking section MP is an image-taking device for photometric stereo, and includes a darkroom BX, a plurality of light sources LS(1) to LS(n), and a camera CA. Hereinafter, the light sources LS(1) to LS(n) are collectively referred to as light sources LS(i). For photometric stereo, the image-taking section MP uses the light sources LS(i) of different orientations to take an image of the object OB of determination, and generates a plurality of images IM of the object OB of determination.

The darkroom BX defines a space for placing the object OB of determination and taking an image of the same. The darkroom BX has walls for cutting off outside light. In the darkroom BX, the object OB of determination, the light sources LS(i), and the camera CA are placed.

The light sources LS(i) are lighting equipment used when the camera CA takes an image of the object OB of determination. The light sources LS(i) are placed in positions and orientations such that the light sources LS(i) illuminate the object OB of determination from respective directions different from each other. In order for color photometric stereo to be provided, the light sources LS(i) apply light containing light of a first wavelength band, light of a second wavelength band, and light of a third wavelength band that are different from each other.

Examples of the first wavelength band, the second wavelength band, and the third wavelength band can include the wavelength bands of R (red), G (green), and B (blue). In the following description, the first wavelength band, the second wavelength band, and the third wavelength band are referred to respectively as R, G, and B, for ease of understanding.

The camera CA is an image-taking device for taking an image of the object OB of determination. Although a single camera CA alone is illustrated here for ease of understanding, a plurality of cameras CA may be placed in positions and orientations so as to take images of the object OB of determination from respective directions different from each other.

The appearance determination device 10 is, for example, a personal computer, and determines whether the object OB of determination is a conforming item (a non-defective item), in accordance with a plurality of images IM of the object OB of determination taken by the image-taking section MP.

The appearance determination device 10 includes a processor 11, a primary memory 12, a secondary memory 13, an input-output interface (IF) 14, a communication IF 15, and a bus 16. The processor 11, the primary memory 12, the secondary memory 13, the input-output IF 14 and the communication IF 15 are connected to each other via the bus 16.

The secondary memory 13 has stored (stored in a non-volatile manner) therein an appearance determination program P1 and a model M1. The processor 11 loads, into the primary memory 12, the appearance determination program P1 and the model M1 stored in the secondary memory 13. The processor 11 then carries out an appearance determination method according to the instructions contained in the appearance determination program P1 loaded in the primary memory 12. The model M1 loaded in the primary memory 12 is used when the processor 11 carries out the appearance determination method.

Examples of a device that can be used as the processor 11 can include a central processing unit (CPU), a graphic processing unit (GPU), a digital signal processor (DSP), a micro processing unit (MPU), a floating point number processing unit (FPU), a physics processing unit (PPU), a microcontroller, and a combination thereof. The processor 11 can be referred to as a "computing device".

Examples of a device that can be used as the primary memory 12 can include a semiconductor random access memory (RAM). The primary memory 12 can be referred to as "main storage". Further, examples of a device that can be used as the secondary memory 13 can include a flash memory, a hard disk drive (HHD), a solid state drive (SSD), an optical disk drive (ODD), a floppy (registered trademark) disk drive (FDD), and a combination thereof. The secondary memory 13 can referred to as "auxiliary storage". The secondary memory 13 may be incorporated in the appearance determination device 10, or may be incorporated in another computer (e.g., a computer of a cloud server) connected to the appearance determination device 10 via the input-output IF 14 or the communication IF 15. Although provided by two memories (the primary memory 12 and the secondary memory 13) in the present embodiment, the storage in the appearance determination device 10 is not limited thereto. The storage in the appearance determination device 10 may be provided by a single memory. In this case, for example, a certain storage area of the single memory may be used as the primary memory 12 and another storage area of the single memory may be used as the secondary memory 13.

To the input-output IF 14, an input device and/or an output device is/are connected. Examples of the input-output IF 14 include a universal serial bus (USB) interface, an advanced technology attachment (ATA) interface, a small computer system interface (SCSI) interface, and a peripheral component interconnect (PCI) interface.

Examples of the input device connected to the input-output IF 14 include the camera CA. Data retrieved from the camera CA in the appearance determination method is inputted to the appearance determination device 10 and stored in the primary memory 12. Further, examples of another input device connected to the input-output IF 14 include a keyboard a mouse, a touchpad, a microphone, and a combination thereof. Examples of the output device connected to the input-output IF 14 include a display, a projector, a printer, a speaker, a headphone, and a combination thereof. Information to be provided to a user in the appearance determination method is outputted from the appearance determination device 10 via the output device listed above. Like a laptop computer, the appearance determination device 10 may incorporate both a keyboard that functions as the input device and a display that functions as the output device. Alternatively, the appearance determination device 10 may incorporate a touch panel that functions as both the input device and the output device, like a tablet computer.

To the communication IF 15, another computer is connected via a network, either through wire or wirelessly. Examples of the communication IF 15 include an Ethernet (registered trademark) interface and a Wi-Fi (registered trademark) interface. Examples of a usable network include a personal area network (PAN), a local area network (LAN), a campus area network (CAN), a metropolitan area network (MAN), a wide area network (WAN), a global area network (GAN), and an internetwork containing a combination thereof. The internetwork may be an intranet, may be an extranet, or may be the Internet. Data retrieved by the appearance determination device 10 from another computer in the appearance determination method and data provided by the appearance determination device 10 to another computer in the appearance determination method are transmitted and received via the network listed above. The camera CA and the appearance determination device 10 may be connected together via the input-output IF 14, or may be connected via the communication IF 15.

Although a single processor (processor 11) is used to carry out the appearance determination method in the present embodiment, the present invention is not limited to this. The appearance determination method may be carried out with the use of a plurality of processors. In this case, the plurality of processors that cooperatively carry out the appearance determination method may be provided in a single computer and may communicate with each other via the bus. Alternatively, the plurality of processors may be distributed among a plurality of computers and communicate with each other via a network. For example, a processor incorporated in a computer of a cloud server and a processor incorporated in a computer owned by a user of the cloud server can cooperate to carry out the appearance determination method.

Although, in the present embodiment, the model M1 is stored in the memory (secondary memory 13) incorporated in the same computer as the computer in which the processor (processor 11) that carries out the appearance determination method is incorporated, the present invention is not limited thereto. The model M1 may be stored in a memory incorporated in a computer that is not the computer in which the processor that carries out the appearance determination method is incorporated. In this case, the computer incorporating the memory for storing the model M1 can communicate via the network with the computer incorporating the processor for carrying out the appearance determination method. For example, the model M1 is stored in a memory incorporated in a computer of a cloud server, and a processor incorporated in a computer owned by a user of the cloud server can carry out the appearance determination method.

Although the model M1 is stored in a single memory (the secondary memory 13) in the present embodiment, the present invention is not limited to this. The model M1 may be distributed among a plurality of memories so as to be stored in the plurality of memories. In this case, a plurality of memories for storing the model M1 may be provided on a single computer (which may or may not be a computer incorporating a processor that carries out an appearance determination method), or may be distributed among a plurality of computers (which may or may not include a computer incorporating a processor that carries out an appearance determination method). For example, the model M1 can be distributed among a plurality of computers of a cloud server so as to be stored in the memories incorporated in the plurality of respective computers.

Figure 2:
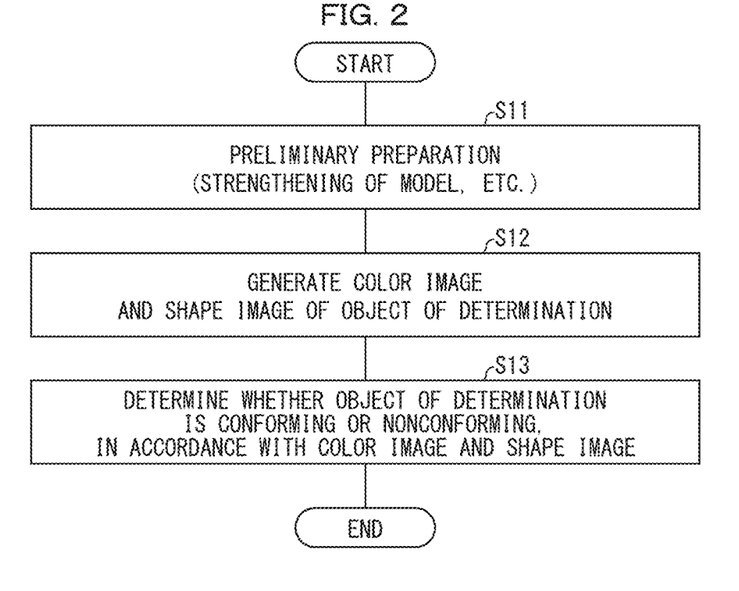
FIG. 2 is a flowchart of an example of an appearance determination method in accordance with an embodiment of the present invention.

The appearance determination device 10 includes at least one processor 11, and carries out the appearance determination method. FIG. 2 is a flowchart of an example of the appearance determination method carried out by the processor 11. The appearance determination method includes a preparation step (step S11), a generation step (step S12), and a determination step (step S13).

The preparation step is a step carried out as required. For example, the preparation step is a step of forming or strengthening the model M 1. Details of the preparation step will be described later. The generation step is the step of generating a color image and a shape image of the object OB of determination, in accordance with the plurality of images IM of the object OB of determination taken by the image-taking section MP. The plurality of images IM are images of the object OB of determination irradiated with light from the plurality of light sources LS(i) of respective orientations different from each other. The determination step is a step of determining whether the object OB of determination is conforming or nonconforming, in accordance with at least one selected from the group consisting of the color image and the shape image.

The object OB of determination is an article that is subjected to appearance determination. The object OB of determination is, for example, a casting having been cast or a mold used in casting. The object OB of determination is not limited to a casting or a mold, and may be another article.

The color image is an image generated by photometric stereo and representing a color optical image of the object OB of determination. The color image is, for example, a color reflection image representing the distribution of reflectances on the surface of the object OB of determination, the color reflection image corresponding to the first wavelength band (R), the second wavelength band (G), and the third wavelength band (B) of light that are different from each other.

In typical photometric stereo, an albedo image representing the distribution of reflectances on the object OB of determination is generated in accordance with a monochrome grayscale image. Therefore, an albedo image is a monochrome grayscale image. In contrast, according to the present embodiment, color photometric stereo is provided so that a color reflection image is generated, the color reflection image representing the distribution of reflectances on the object OB of determination in color. Details of the generation of the color reflection image will be described later.

The shape image is an image generated by photometric stereo and representing the shape of the object OB of determination. The shape image is, for example, a normal image representing the distribution of normal directions on the surface of the object of determination. In accordance with the plurality of images IM of the object OB of determination taken by the image-taking section MP, a normal image is generated together with the color reflection image.

A conforming item is an object (e.g., a casting) that does not contain a defect. Examples of the defect include chipping, cracking, a dent, a protuberance, and the presence of foreign matter (e.g., screw, paper scrap, rust, and sand). Conforming items are allowed to be non-identical to each other due to asperities, color unevenness, the presence or absence of burrs, etc. of the surface of the casting.

Figure 3:
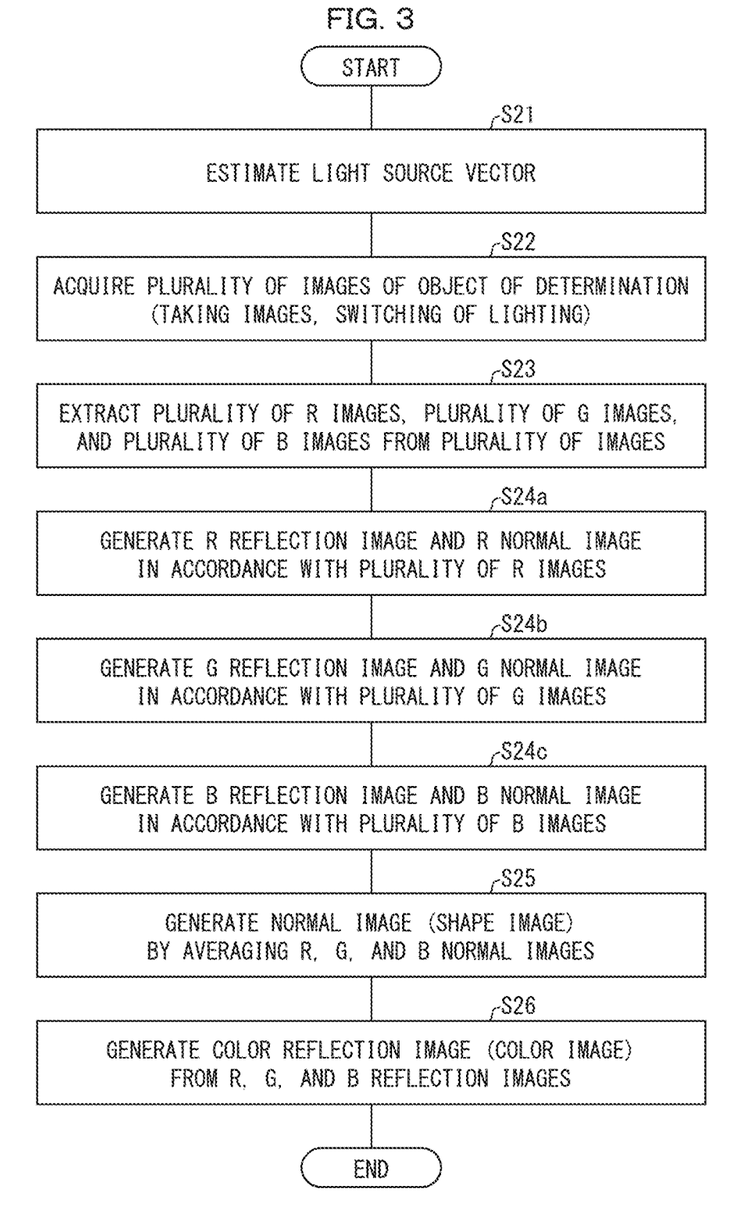
FIG. 3 is a flowchart of an example of a method for generating a color reflection image (color image) and a normal image (shape image).

Here is a description of the generation step (step S12). FIG. 3 is a flowchart of an example of a method for generating a color reflection image (color image) and a normal image (shape image). The generation step illustrated in FIG. 3 can roughly be divided into (A) an estimation step (step S21) of estimating a light source vector L(i), (B) an acquisition step (step S22) of acquiring a plurality of images IM(i) of the object OB of determination, and (C) a generation step (step S23, S24a to S24c, S25, and S26) of generating a color image and a shape image of the object OB of determination. The details are as follows.

(A) Estimation Step of Estimating Light Source Vector L(i) (Step S21)

The processor 11 estimates a light source vector L(i) (the direction of each of the plurality of light sources LS(i) (step S21).

The light source vector L(i) is a vector representing the orientation of the light source LS(i) with respect to the object OB of determination and the distance of the light source LS(i) to the object OB of determination. The light source vector L(i) is used to create a color reflection image (color image) and a normal image (shape image). This estimation means determining the orientation of each of the plurality of light sources LS(i).

In photometric stereo, by measuring the positional relationship between the light source LS(i) and the object OB of determination, the light source vector L(i) can be determined. However, this measurement is difficult in some cases. In such cases, it is necessary to estimate the light source vector L(i). The details of this estimation will be described later.

(B) Acquisition Step of Acquiring Plurality of Images IM(i) of Object OB of Determination (Taking Images, Switching of Lighting) (Step S22)

The processor 11 acquires a plurality of images IM(i) of the object OB of determination (step S22). Prior to this acquisition, the object OB of determination is placed in the darkroom BX.

By taking images of the object OB of determination via the camera CA while switching the light sources LS(i), a plurality of images IM(i) of the object OB of determination can be acquired. The plurality of images IM(i) are a plurality of images of the object OB of determination irradiated with light emitted from each of the plurality of light sources LS(i) having respective orientations different from each other. The images IM(i) are taken with use of light containing light of R (first wavelength band), G (second wavelength band), and B (third wavelength band) and are color images containing pixels of R, G, and B.

(C) Generation Step of Generating Color Image and Shape Image of Object OB of Determination (Steps S23, S24a to S24c, S25, S26)

In this generation step, a color image and a shape image of the object OB of determination are generated in accordance with the plurality of images IM(i) and the determined directions (light source vectors L(i)). The generation step can be divided into the following steps: (1) a step (step S23) of extracting a plurality of R images, a plurality of G images, and a plurality of B images; (2) a step (steps S24a to 24c) of generating an R reflection image, a G reflection image, and a B reflection image, and an R normal image, a G normal image, and a B normal image; (3) a step (step S25) of generating a normal image (shape image); and (4) a step of generating a color reflection image (color image) (step S26). The details are as follows.

(1) Extract Plurality of R Images IMr(I), Plurality of G Images Img(I), and Plurality of B Images IMb(I) from Plurality of Images Im(I) (Step S23)

The processor 11 extracts, from the plurality of images IM(i) (step S23), a plurality of first images (a plurality of R images IMr(i)) corresponding to the first wavelength band (R), a plurality of second images (a plurality of G images IMg(i)) corresponding to the second wavelength band (G), and a plurality of third images (a plurality of B images IMb(i)) corresponding to the third wavelength band (B).

By extracting the pixels of R, G, and B from the color image IM(i), an R image IMr(i) constituted by the pixels of R, a G image IMg(i) constituted by the pixels of G, and a B image IMb(i) constituted by the pixels of B can be generated.

In typical photometric stereo, color is not considered and an albedo image (the reflection image herein) is generated from a monochrome grayscale image, as described above. According to the present embodiment, in order for color photometric stereo to be provided, the R images IMr(i), the G images IMg(i), and the B images IMb(i) are extracted from the images IM(i) to be individually processed. This makes it possible to provide color photometric stereo.

(2) Generation of R, G, and B Reflection Images and R, G, and B Normal Images Based on Plurality of R, G, and B Images (Steps S24a to 24c)

The processor 11 generates an R reflection image (a first reflection image representing the distribution of reflectances on the surface of the object OB of determination) and an R normal image (a first normal image representing a first distribution of normal directions on the surface of the object OB of determination) that are associated with the pixels of R, in accordance with the plurality of R images IMr(i) (a plurality of first images) (step S24a).

Similarly, in accordance with the plurality of G images IMg(i) (the plurality of second images), a G reflection image (a second reflection image representing the distribution of reflectances on the surface of the object OB of determination) and a G normal image (a second normal image representing a second distribution of normal directions on the surface of the object OB of determination) that are associated with the pixels of G are generated (step S24b). In accordance with the plurality of B images IMb(i) (the plurality of third images), a B reflection image (a third reflection image representing the distribution of reflectances on the surface of the object OB of determination) and a B normal image (a third normal image representing a third distribution of normal directions on the surface of the object OB of determination) that are associated with the pixels of B are generated (step S24c).

Optionally, the first distribution, the second distribution, and the third distribution of normal directions are not represented as images such as the R normal image, the G normal image, and the B normal image. The representation of the distribution of normal directions is sufficient for the first to third distributions of normal directions.

In typical photometric stereo, a luminance I(i), a reflectance ρ, the light source vector L(i), and a normal vector n of a given pixel of the image IM(i) are in the relationship as indicated by the following equation (1).

$$I(i)=\rho(L(i)\cdot n) \qquad \text{Equation (1)}$$

The light source vector L(i) is estimated by step S21, and the luminance I(i) is determined from the image IM(i). In contrast, the reflectance p and the normal vector n are unknowns. Therefore, simultaneous equations made up of a plurality of equations of different light source vectors L(i) are used to calculate the reflectance p and the normal vector n.

As a result, by determining reflectances p and normal vectors n of all pixels of the image IM(i), it is possible to generate a reflection image (the so-called albedo image) representing the distribution of the reflectances p on the object OB of determination and a shape image (the so-called normal vector image) representing the distribution of the normal vectors n on the object OB of determination.

In the present embodiment, instead of equation (1), the following equations (2a) to (2c) are used to be applied to R, G, and B (light of the first wavelength band, light of the second wavelength band, and light of the third wavelength band).

$$Ir(i)=\rho r(L(i)\cdot nr) \qquad \text{Equation (2a)}$$

$$Ig(i)=\rho g(L(i)\cdot ng) \qquad \text{Equation (2b)}$$

$$Ib(i)=\rho b(L(i)\cdot nb) \qquad \text{Equation (2c)}$$

Ir(i), Ig(i), Ib(i): luminances I(i), corresponding to R, G, and B, at one point on the object OB of determination, i.e., luminances, corresponding to R, G, and B, of a pixel of the image IM(i)

ρg, ρg, and ρb: reflectances ρ, corresponding to R, G, and B, at one point on the object OB of determination ng, ng, and nb: normal vectors, corresponding to R, G, and B, at one point on the object OB of determination It is therefore possible to calculate respective reflectances ρr, ρg, and ρb and respective normal vectors nr, ng, and nb for R, G, and B, in accordance with the light source vector L(i) (the orientation of the calculated light source LS(i)). In accordance with the reflectances ρr, ρg, and ρb, it is possible to generate an R reflection image corresponding to the pixels of R, a G reflection image corresponding to the pixels of G, and a B reflection image corresponding to the pixels of B (eventually in the form of a color reflection image, as will be described later). In accordance with the normal vectors nr, ng, and nb, it is possible to generate an R normal image corresponding to the pixels of R, a G normal image corresponding to the pixels of G, and a B normal image corresponding to the pixels of B (eventually in the form of a normal image, as will be described later).

(3) Generation of normal image (shape image) by averaging R, G, and B normal images (step S25)

The processor 11 generates a normal image (shape image) by averaging the distribution (first distribution) of normals in the R normal image (first normal image), the distribution (second distribution) of normals in the G normal image (second normal image), and the distribution (third distribution) of normals in the B normal image (third normal image) (step S25). Thus, it is possible to generate the normal image (shape image) by averaging the normal directions in the first distribution, the second distribution, and the third distribution.

A normal on the object OB of determination is a quantity corresponding to the shape thereof, and is considered to be basically independent of the wavelength of light. Therefore, it is reasonable to organize the normal vectors nr, ng, and nb for R, G, and B into a single normal vector n. Specifically, the average value of the normal vectors nr, ng, and nb of neighboring places is calculated and defined as the normal vector n. This normal vector n is used to generate a normal image representing the distribution of normals on the object OB of determination.

The normal image may be generated by removing an outlier from the normal vectors nr, ng, and nb and then averaging the normal vectors nr, ng to determine the normal vector n. By removing an outlier, the accuracy of the normal vector n is improved.

In order for an outlier to be removed, a technique for removing an abnormal light source vector, which will be described later, can be applied. As an example, a normal vector n that deviates, by a predetermined value (distance) or more, from the acquired average nav of the plurality of normal vectors nr, ng, and nb at neighboring places on the object OB of determination is removed for being abnormal. As another example, DBSCAN may be used to remove an outlier.

Alternatively, the normal image may be generated with use of any of the normal vectors nr, ng, and nb without averaging the normal vectors nr, ng, and nb.

(4) Generation of Color Reflection Image (Color Image) from R, G, and B Reflection Images (Step S26)

The processor 11 composites the R reflection image (first reflection image), the G reflection image (second reflection image), and the B reflection image (third reflection image) to generate a color reflection image (step S26). Therefore, by using the reflectances ρr, ρg, and ρb for R, G, and B as the luminances (ρr, ρg, ρb) of a pixel for R, G, and B, it is possible to generate a color reflection image.

As described above, the color reflection image and the normal image are generated from the plurality of images IM(i) of the object OB of determination.

In the above description, the reflectances p and the normal vector n are calculated for each of all pixels of R, G, and B in steps S24*a* to 24*c*. This processing requires a large amount of computation. With the techniques described below, it is possible to generate a color reflection image and a normal image with a reduced amount of computation.

Figure 4:
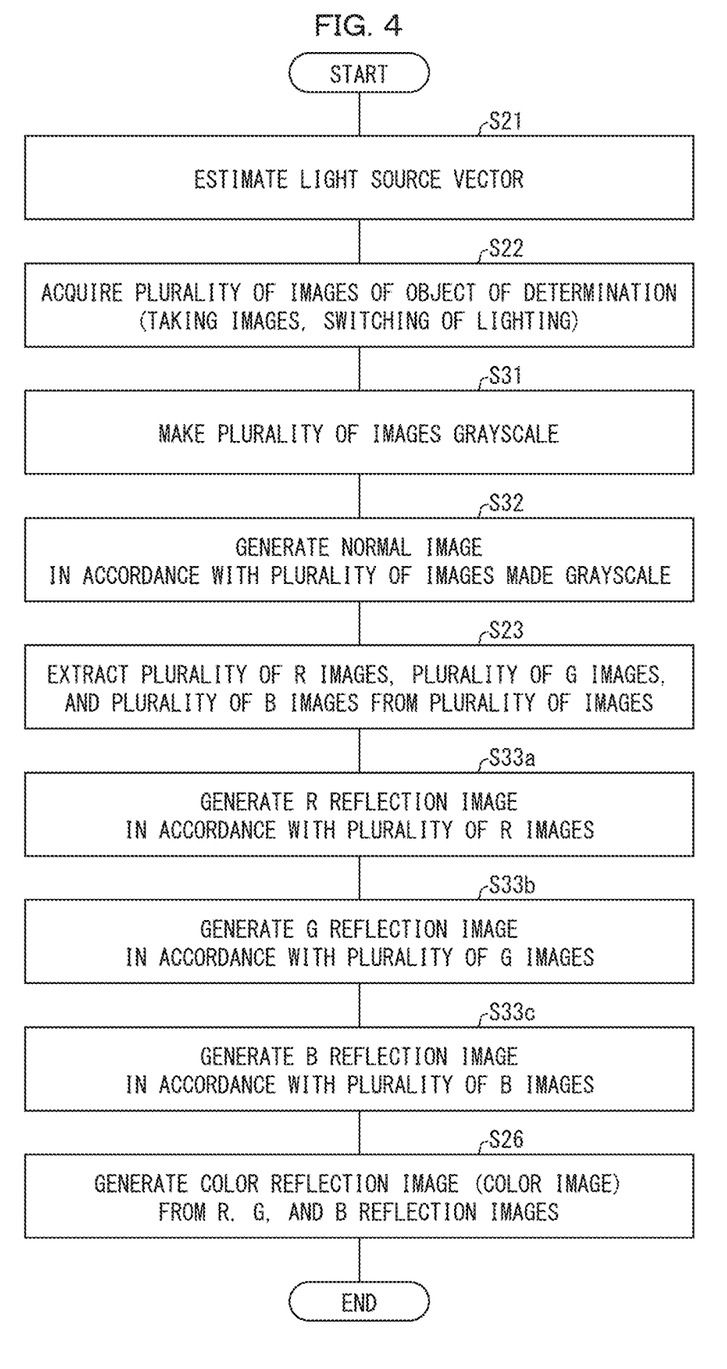
FIG. 4 is a flowchart of another example of the method for generating a color reflection image (color image) and a normal image (shape image).

FIG. 4 is a flowchart of another example of the method for generating a color reflection image (color image) and a normal image (shape image). Since the steps S21 and S22 are the same as those of FIG. 3, the description thereof is omitted.

In this example, the processor 11 makes a plurality of images IM(i) grayscale in monochrome to acquire a plurality of images IM(i) made grayscale (step S31). The processor 11 then generates a normal image in accordance with the plurality of images IM(i) having been made grayscale, in step S32.

In this generation, the normal vector n is calculated using the above-described equation (1) and an image of the normal vector n is created, so that the normal image is generated.

Thus, it is not necessary to calculate the normal vectors nr, ng, and nb for each of R, G, and B. This allows a reduction in the amount of computation. Along with the normal vector n, the reflectance p is calculated. This reflectance ρ does not need to be used.

As to the color reflection image, an R reflection image, a G reflection image, a G reflection image, and a B reflection image are generated from the R image, the G image, and the B image extracted (step S23) in the same manner as in FIG. 3 (step S33*a* to S33*c*). In this generation, the following equations (3a) to (3c) can be used instead of the equations (2a) to (2c).

$$Ir(i)=\rho r(L(i)\cdot n) \quad \text{Equation (3a)}$$

$$Ig(i)=\rho g(L(i)\cdot n) \quad \text{Equation (3b)}$$

$$Ib(i)=\rho b(L(i)\cdot n) \quad \text{Equation (3c)}$$

It is therefore possible to calculate the reflectances ρr, ρg, and ρb with use of the normal vector n calculated in step S32. In this case, the normal vector n is known, and only the reflectances ρr, ρg, and ρb are unknowns, accordingly. This allows a significant reduction in the amount of computation.

In this manner, using a plurality of images IM(i) having been made grayscale allows a reduction in the amount of computation required for generation of the color reflection image and the normal image.

Figure 5:
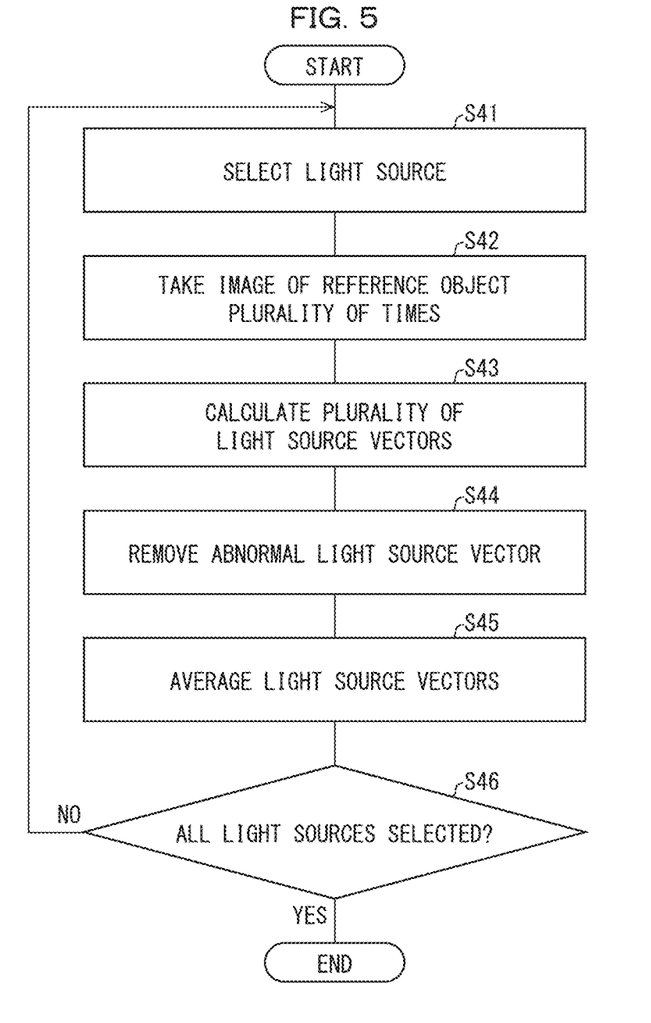
FIG. 5 is a flowchart of an example of a method for estimating a light source vector.

Details of the estimation (step S21) of the light source vector is described next. FIG. 5 is a flowchart of an example of the estimation step of estimating a light source vector. As described above, the estimation step functions as the step of determining the respective orientations of the plurality of light sources LS(i).

(1) Selection and Image-Taking of a Light Source (Steps S41 and S42)

The processor 11 selects a light source LS(i) (step S41) and takes an image of a reference object a plurality of times (e.g., 30 times) (step S42). A plurality of images of the reference object irradiated with light from a light source LS(i) which are sequentially selected from the plurality of light sources LS(1) to LS(n) are acquired. Prior to this image-taking, the reference object is placed in the darkroom BX.

The reference object is, for example, a white plate (e.g., paper), and an object having the normal direction (normal vector n) and the reflectance ρ that are known is typically used. As will be described later, in order for a single light source vector L(i) to be determined, image-taking is carried out three times for different orientations (normal vectors n) of the reference object as a set, for example. Thus, "30 times" here makes it possible to calculate a light source vector L(i) at least 10 times.

(2) Calculation of Plurality of Light Source Vectors (Step S43)

The processor 11 calculates a plurality of light source vectors L(i) corresponding to a light source LS(i) from the plurality of images having been taken (step S43). A plurality of values for the orientation (light source vector L(i)) of the light source LS(i) are determined.

In a case where the normal vector n and the reflectance ρ of the reference object are known, the light source vector L(i) can be easily calculated using the above-described equation (1). Since a light source vector L(i) has three variables (x, y, z), a light source vector L(i) is typically calculated from three different images for three different orientations (normal direction) of the reference object. As a result, for example, 10 light source vectors L(i) are acquired from 30 images of the light sources LS(i).

(3) Removal of Abnormal Light Source Vector and Averaging of Light Source Vectors (Steps S44 and S45)

The processor 11 removes an abnormal light source vector L(i) from the acquired light source vectors L(i) (step S44) and averages the remaining light source vectors (step S45). In accordance with the light source vectors remaining after the removal of an abnormal light source vector, an estimate Lp(i) (the orientation of the light source LS(i)) of the light source vector L(i) is acquired. A value deviating by a predetermined value or more from the average of the plurality of values (light source vectors L(i)) is removed from the plurality of values (light source vectors L(i)), and in accordance with the plurality of values (a plurality of light source vectors L(i)) excluding the value deviating by the predetermined value or more, the orientation of the light source LS(i) (an estimate Lp(i) of the light source vector L(i)) is determined.

The above process is repeated until all light sources LS(i) are selected and the light source vectors L(i) thereof are estimated (step S46).

Figure 6:
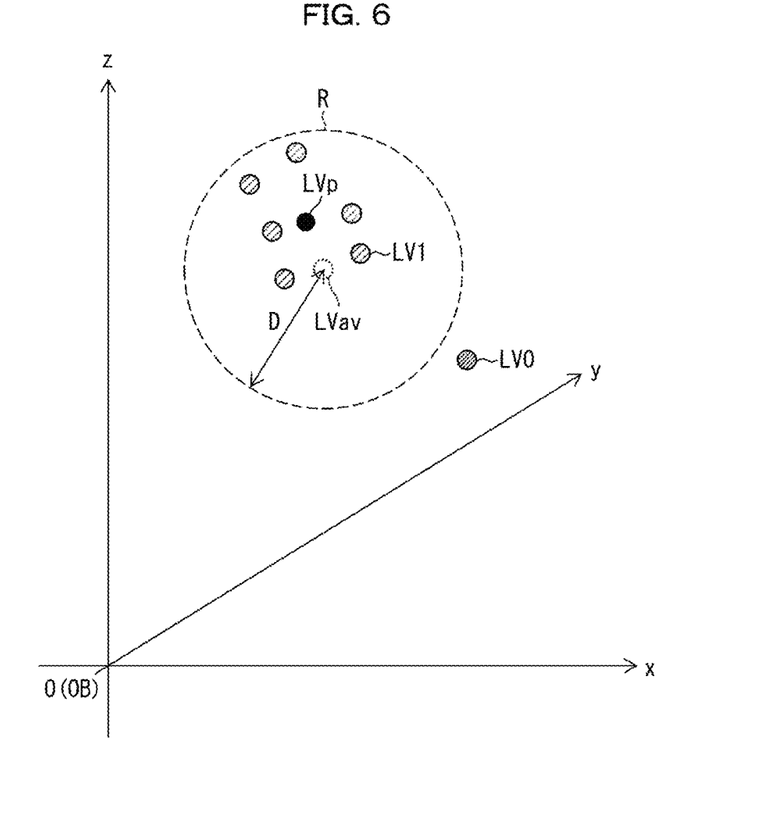
FIG. 6 is a view of an example of the approach to removing an abnormal light source vector.

FIG. 6 is a view of an example of the approach to removing an abnormal light source vector. The light source vector L(i) is represented as a point (x, y, z) on the xyz coordinate system. The object OB of determination is disposed at the origin O.

In this example, the light source vectors L(i) are each classified as a light source vector L1(i) falling within a normal range R or as an (abnormal) light source vector L0(i) falling outside the normal range R. However, all of the light source vectors L(i) are of the same light source LS(i) and should be identical to each other. However, due to measurement or calculation errors, a calculated light source vector L(i) can deviate significantly from the intrinsic value. Thus, by removing the abnormal light source vector L0(i) in the step of estimating the light source vector L(i), it is possible to improve the accuracy of estimation of the light source vector L(i).

In this example, the light source vector L0(i) that deviates by a predetermined value (distance) D or more from the average Lav(i) of the plurality of light source vectors L(i) acquired is removed as an outlier, and the estimate Lp(i) of the light source vector is calculated by averaging the remaining light source vectors L1(i).

The distance D may be specified in the form of a number, such as "0.05". Alternatively, the distance D may be specified to be, for example, 1σ, on the basis of the standard deviation σ of the plurality of light source vectors L(i) acquired.

In order for the outlier to be removed, another technique which is, for example, density-based spatial clustering of applications with noise (DBSCAN) may be used. In DBSCAN, data points are clustered on the basis of the density of coordinates, and a point in the low-density region is removed as an outlier (noise).

Figure 7:
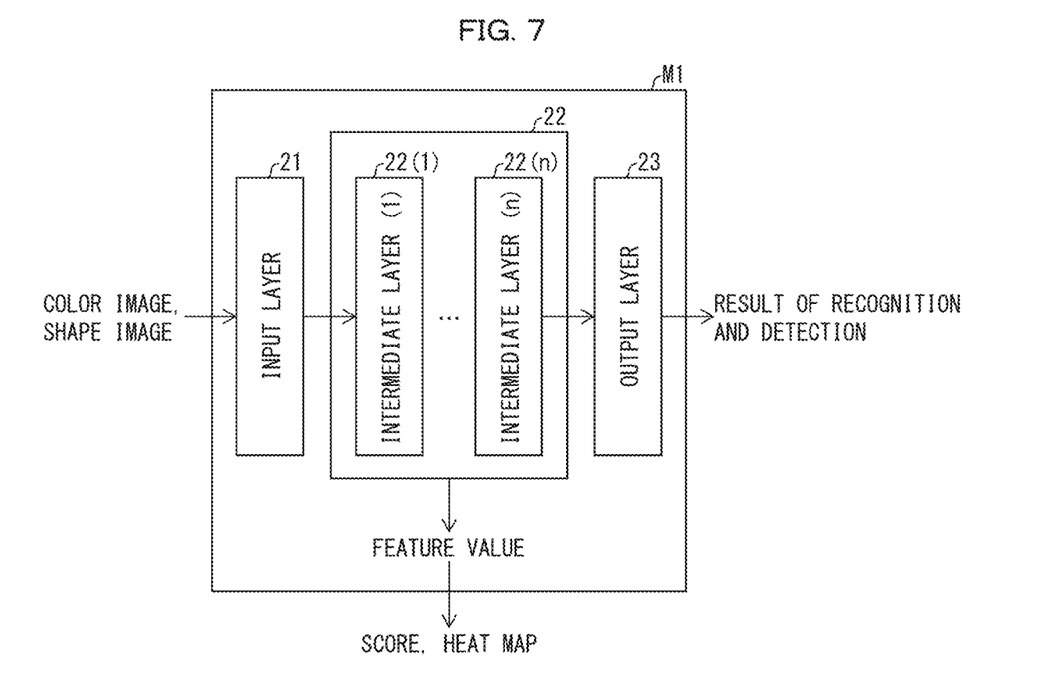
FIG. 7 is a schematic view of a model.

The determination step will be described below, after the description of a model M1. FIG. 7 is a schematic view of the model M1. The model M1 has an input layer 21, an intermediate layer 22, and an output layer 23. The intermediate layer 22 has a plurality of intermediate layers 22(1) to 22(n). These intermediate layers 22(i) are, for example, convolution layers and pooling layers.

In accordance with at least one selected from the group consisting of the color image of the object OB of determination and the shape image of the object OB of determination (hereinafter collectively referred to as an image), the model M1 carries out, for example, output of the degree of similarity to a conforming item, anomaly detection (herein, output of a score or a heat map), and detection of a defect based on image recognition (recognition of an image corresponding to a defect). For example, a score or a heat map are outputted in accordance with at least one feature value outputted from the intermediate layer 22. Although the result of recognition and detection is outputted from the output layer 23, and the feature value is outputted eventually in the form of a score or a heat map from the intermediate layer 22 for ease of understanding, only one of these outputs may be carried out, and the output from the output layer 23 may be carried out in accordance with the at least one feature value outputted from the intermediate layer 22.

The model M1 is a trained model of a neural network, and is generated by input of a plurality of images. By using, as this model M1, the following various models (1) to (4), a conformity-nonconformity determination can be made.

(1) Model that Outputs Degree of Similarity to Conforming Item

As the model M1, a neural network model to which a conforming item itself is mapped can be used to acquire the degree of similarity between the conforming items and the object OB of determination. Examples of the model M1 can include a common convolutional neural network (CNN) model.

In this case, in the preliminary preparation step (step S11), the model M1 to which the image of a conforming item of the object OB of determination is mapped is formed by deep learning with use of the image of the conforming item. This allows calculation of the degree of similarity of the object OB of determination based on the distance between the image of the conforming item mapped to the model M1 and an inputted image of the object OB of determination.

When an image of the object OB of determination is inputted to the trained model M1, the degree of similarity between the conforming item and the object OB of determination is outputted from the model M1. For example, the processor 11 determines that the object OB of determination is a conforming item when the degree of similarity is greater than a predetermined threshold, and determines that the object OB of determination is a defective item when the degree of similarity is equal to or smaller than the predetermined threshold.

(2) Model that Outputs Result of Anomaly Detection (Score, Heat Map) in Accordance with Features of Object OB of Determination With use, as the model M1, of a neural network model to which features of the object OB of determination that is a conforming item are mapped, it is possible to acquire a result (score or heat map) of anomaly detection based on a feature value (in the intermediate layer 22) of the object OB of determination. This model M1 is based on the trend of outputting, from the intermediate layer 22, feature values approximate to each other for images approximate to each other. Examples of the model M1 can include Mahalanobis AD, SPADE, PaDiM, PatchCore, and FastFlow.

In this case, in the preliminary preparation step (step S11), the model M1 is formed by mapping features of a conforming item by deep learning in which the image of a conforming item of the object OB of determination is used. The model M1 functions as the feature extractor. This eliminates the need to map the conforming item itself in the deep learning, and extracting the feature values of the conforming item is sufficient. As a result of the deep learning, it becomes possible to make anomaly detection (calculation of a score, formation of a heat map) in accordance with a distance between a feature of the conforming item mapped to the model M1 and a feature of the object OB of determination outputted from the intermediate layer 22.

Although the anomaly detection may be carried out in accordance with a feature value itself of the object OB of determination outputted from the intermediate layer 22, the anomaly detection may be carried out by inputting this feature value to another model M1. Examples of such anomaly detection can include FastFlow.

When the image of the object OB of determination is inputted to the trained model M1, at least one selected from the group consisting of a score and a heat map is outputted in accordance with at least one feature value of the object OB of determination outputted from the intermediate layer 22. The score is, for example, a score of the entire image. Examples of such a score include an anomaly score representing the degree of abnormality in light of the features of a conforming item. The heat map is a map in the object OB of determination are divided into segments according to the degree of score. Note that a heat map is often used in the course of determination in anomaly detection, and is not necessarily outputted as the final result of the abnormality detection.

The processor 11 determines whether the object OB of determination is conforming or nonconforming, in accordance with a score or a heat map that have been acquired. For example, the processor 11 determines that the object OB of determination is a conforming item when the score (anomaly score) is smaller than a predetermined threshold, and determines that the object OB of determination is a defective item when the score is equal to or greater than the predetermined threshold. In a case of using the heat map, for example, the processor 11 determines that the object OB of determination is a conforming item when the segments of the scores each of which is equal to or greater than a given value cover an area (or the number of pixels) which is smaller than the predetermined threshold, and determines that the object OB of determination is a defective item when the segments of the scores each of which is equal to or greater than the given value cover an area which is equal to or greater than the predetermined threshold.

In Mahalanobis AD, feature values from the intermediate layer 22 are treated as a multivariate normal distribution, a Mahalanobis distance is calculated for each of the intermediate layers 22(i) and the sum of the Mahalanobis distances is calculated, and the sum is outputted as a distance (score).

In SPADE, PaDiM and PatchCore, a heat map is formed in accordance with feature values outputted from the intermediate layer 22. In SPADE, feature values outputted from the intermediate layer 22 are treated on a pixel-by-pixel basis, and are subjected to comparative classification based on the kNN distance to be represented in the form of a heat map. In PaDiM, feature values outputted from the intermediate layer 22 are treated on a pixel-by-pixel basis, and are subjected to comparative classification based on the average and the covariance to be represented in the form of a heat map. In PatchCore, feature values outputted from the intermediate layer 22 are subjected to selection, and are represented in the form of a heat map on the basis of the nearest value.

Also in FastFlow, feature values are acquired from the intermediate layer 22, and a result of anomaly detection (e.g., a score, a heat map) is outputted in accordance with these feature values. More specifically, as the model M1, a CNN-based model or a Transformer-based model is used to create a heat map. Mahalanobis AD, SPADE, PaDiM, PatchCore do not require transfer learning while FastFlow requires transfer learning.

(3) Model that Outputs Result of Defect Detection in Accordance with Image Recognition As the model M1, a model for image recognition that detects a defect of the object OB of determination can be used. Examples of such a model M1 can include models of you only look once (YOLO), semantic segmentation, and instance segmentation.

In this case, the model M1 which is capable of detecting a defect and the type of the defect is formed in the preliminary preparation step (step S11) by deep learning in which an image of a defect (e.g., chipping, foreign matter) to be detected in the object OB of determination.

When an image of the object OB of determination is inputted to the model M1, the type of a defect (e.g., foreign matter, chipping) detected in the image is outputted. In this output, in some cases, the portion (region) at which the defect is present is also outputted together. For example, the processor 11 determines that the object OB of determination is a conforming item when a defect is not detected, and determines that the object OB of determination is a defective item when a defect is detected. In a case where the (region) at which the defect is present is outputted, the processor 11 may determine that the object OB of determination is a conforming item when the area of the defect region is smaller than a predetermined threshold, and may determine that the object OB of determination is a defective item when the area of the defect region is equal to or greater than the predetermined threshold.

(4) Combined Use of Models

In the above description, the conformity-nonconformity determination is made with use of any one selected from the group consisting of the model M1 for outputting the degree of similarity, the model M1 for anomaly detection (a score, a heat map), and the model M1 for image recognition. A plurality of models M1 may be used in combination for the conformity-nonconformity determination. For example, either the degree of similarity or anomaly detection can be combined with image recognition. This makes it possible to improve the accuracy of the determination.

The model M1 (e.g., a typical CNN or PatchCore) that outputs the degree of similarity or a result of anomaly detection is formed, basically by learning based on an image of a conforming item. It is therefore easy to determine that the object OB of determination which contains a defect having a color different from the color of a conforming item (e.g., a black screw or a white paper scrap on a gray casting) is a defective item. However, it is not easy to determine that the object OB of determination that contains a defect having a color close to the color of a conforming item (e.g., a lack of gray color in a part of a gray casting) is a defective item.

Therefore, by combining the model M1 for outputting the degree of similarity or the model M1 for anomaly detection with the model M1 for image recognition, it is possible to increase the accuracy of the determination. For example, it is possible to make conformity-nonconformity determination by image recognition and then make conformity-nonconformity determination, based on feature values, of only the objects OB of determination in each of which no defect has been detected by the image recognition.

In the above-described embodiment, at least one selected from the group consisting of the color reflection image and the normal image may be divided so that conformity-nonconformity determination may be made for each of the divisions of the object OB of determination. For example, a color reflection image and a normal image are divided into four, and a total of eight images are used for the conformity-nonconformity determination. The number of divisions is not limited to 4, but may be more than or less than 4. For example, the processor 11 may divide an albedo image and a normal vector image into six or nine images.

By dividing the image and making conformity-nonconformity determination for each of the segments of the object OB of determination, it is possible to improve the accuracy of determination as to whether the object OB of determination is conforming or nonconforming. For example, it may be determined that: the object OB of determination is a conforming item when it is determined that all of the image divisions of the object OB of determination are conforming items; and the object OB of determination is a defective item when it is determined that any of the image divisions of the object OB of determination is a defective item.

In the embodiment described above, at least one selected from the group consisting of the color reflection image and the normal image may undergo mask processing. For example, regions (e.g., background regions) of the color reflection image and the normal image, the regions not being required to be subjected to determination, are filled with a mask image prepared in advance. This allows an improvement in the accuracy of the determination. This mask processing may be performed on a divided color reflection image and a divided normal image.

Collecting images for learning is not necessarily easy because many images are required. Therefore, the number of images may be increased by processing an image of a conforming item having been taken.

The following description will discuss Examples of the present invention. In Examples, the object OB of determination is a casting, and the appearance of the object OB of determination was determined by the appearance determination device 10. A conforming item and a defective item of the casting were taken by the image-taking section MP so that a plurality of images IM were acquired, and an image (a color reflection image in Examples) was generated. By the steps illustrated in FIG. 5, the light source vector L(i) of the light source LS(i) was estimated. The casting having foreign matter (screw or paper scrap) placed thereon is defined as a defective item.

The generated images were inputted to the model M1 (models of semantic/instance segmentation, YOLO) for image recognition and the model M1 (Mahalanobis AD and PatchCore) for anomaly detection, so that whether the appearance is conforming or nonconforming was determined. Conformity-nonconformity determinations of the appearance with use of semantic segmentation and with use of instance segmentation were made and the results thereof were found to be similar to each other. Thus, semantic segmentation and instance segmentation are collectively referred to as "semantic/instance segmentation" herein.

The model M1 for image detection was trained so as to be capable of detecting a defect, by preliminary learning based on images of defects (foreign matter such as a screw and chipping) of the casting. The model M1 for anomaly detection was trained so as to be capable of outputting a score or a heat map, by preliminary learning based on the image of a conforming item.

Figure 8:
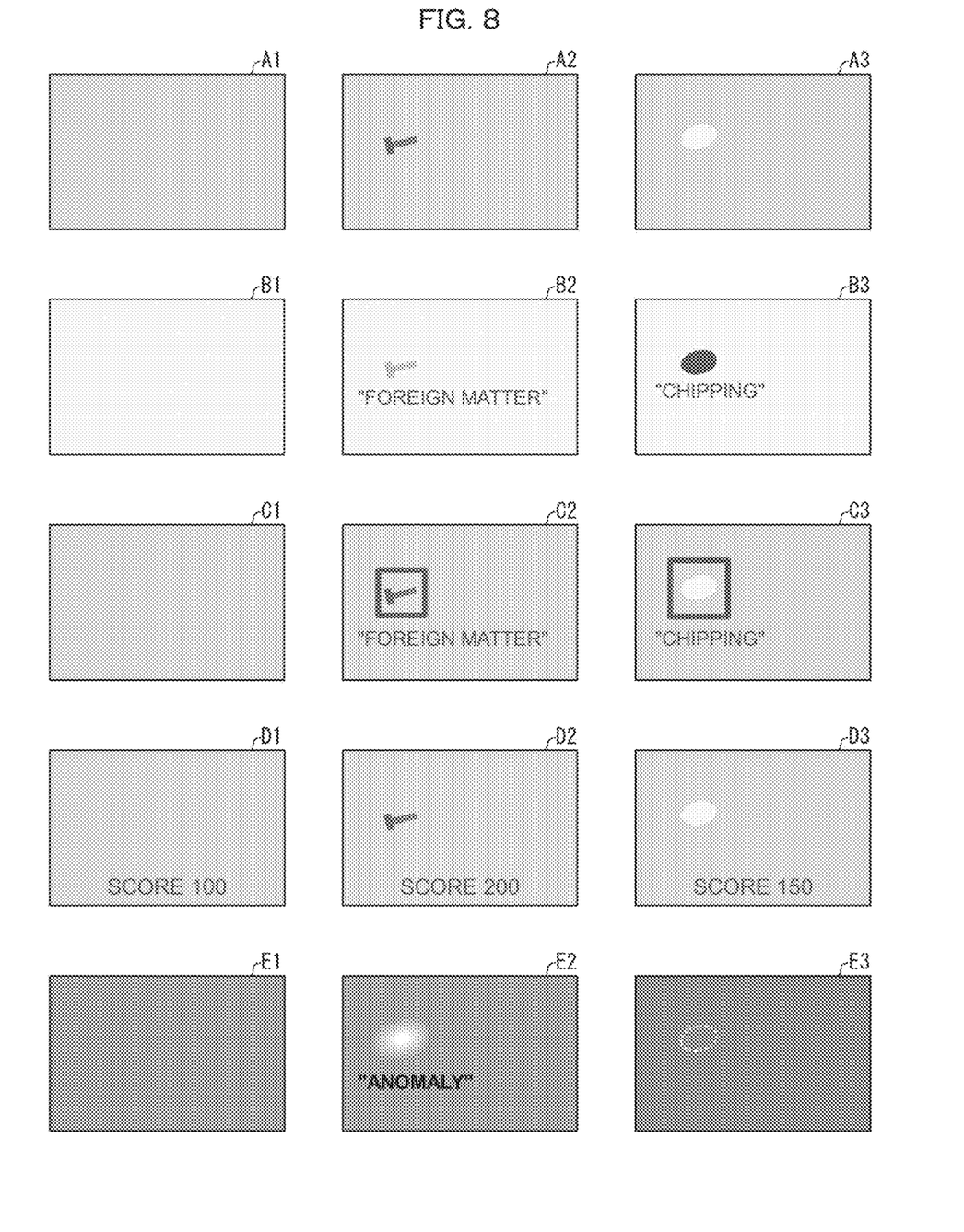
FIG. 8 is a view illustrating examples of appearance determination results.

FIG. 8 is a view illustrating examples of appearance determination results. An image A1, an image A2, and an image A3 are color images of the object OB of determination, and represent a conforming item, a defective item containing foreign matter (screws), and a defective item containing chipping, respectively. An image B1, an image B2, and an image B3 represent the results of determination made with use of semantic/instance segmentation, respectively regarding the image A1, the image A2, and the image A3. Similarly, images C1 to C3, images D1 to D3, and images E1 to E3 represent the results of determination made respectively with use of YOLO, Mahalanobis AD, and PatchCore, regarding the images A1 to A3.

As seen in the images B1 to B3 and the images C1 to C3, with semantic/instance segmentation and YOLO, in which image recognition is carried out, the images A2 containing foreign matter and the images A3 containing chipping were recognized as "foreign matter" and "chipping". Furthermore, with YOLO, the places at which the "foreign matter" and the "chipping" were present were identified by a square frame (bounding box). This shows that semantic/instance segmentation and YOLO allow determination as to whether the casting is conforming or nonconforming.

As seen in the images D1 to D3, with Mahalanobis AD, the discrimination between a conforming item and a defective item was successfully made according to whether the score is great or small. Thus, it is possible to determine that the object of determination is a defective item when, as a result of comparing a score outputted by Mahalanobis AD with a threshold value (e.g., 120), the score is greater than the threshold value.

As seen in the images E1 to E3, with PatchCore, the discrimination between a conforming item and a defective item is made with use of a heat map. Regarding the image A2, determination of anomaly was successfully made from the heat map. However, regarding the image A3, in which the color of the chipping portion is close to the color of the other portion, anomaly detection was not reached.

As seen in the images A1 to E1, all of the objects OB of determination that are conforming items were determined to be conforming items. A hundred conforming items were subjected to appearance determination, and all of the items were determined to be conforming items.

As described above, with Mahalanobis AD, both the image A2 (of a defective item containing foreign matter) and the image A3 (of a defective item containing chipping) were successfully determined to be defective items. On the other hand, with Patch Core, although the image A2 was successfully determined to be defective, the image A3 was not determined to be defective. This may be because the color of the "chipping" of the image A3 is close to the color of the casting itself.

However, it can be understood that, in such a case, the accuracy of the conformity-nonconformity determination can be improved by using PatchCore in combination with semantic/instance segmentation or YOLO for image recognition. For example, PatchCore is used for conformity-nonconformity determination of the object OB of determination having a defect that has not been detected with use of semantic/instance segmentation or YOLO.

In the above Example, a color reflection image is used for appearance determination. Alternatively, a normal image or both a color reflection image and a normal image may be used for the appearance determination.

Figure 9:
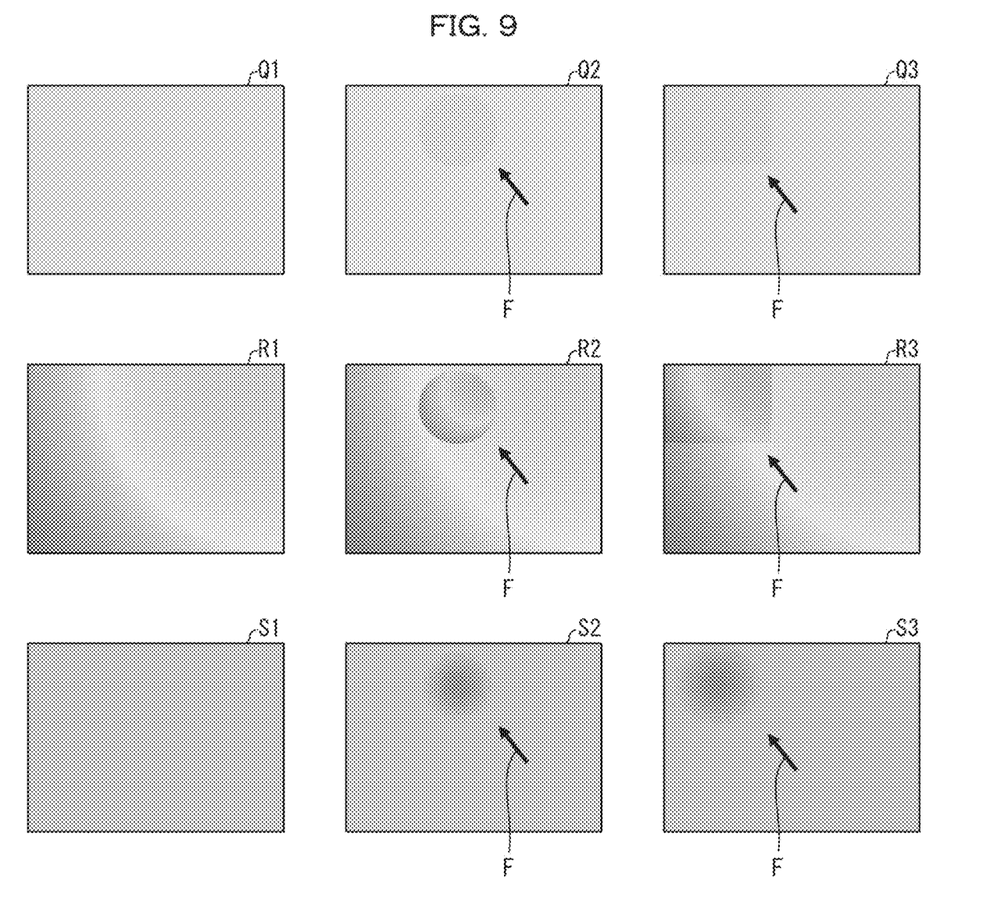
FIG. 9 is a view illustrating another example of appearance determination results.

FIG. 9 is a view illustrating another example of appearance determination results, the view illustrating examples of the appearance determination results obtained with use of both the color reflection image and the normal image. An image Q1, an image Q2, and an image Q3 of FIG. 9 are color reflection images of the object OB (casting) of determination, and represent a conforming item, a defective item containing foreign matter, and a defective item containing chipping, respectively. The image Q2 represents a state of foreign matter adhering to the casting. The color of the foreign matter is close to the color of the surface of the casting. Images R1, R2, and R3 are normal images of the object OB (casting) of determination, and correspond respectively to the images Q1, Q2, and Q3. Images S1, S2, and S3 represent the results (heat maps) of determination made with use of PatchCore, respectively regarding the images R1, R2, and R3. The arrow F indicates a defective portion (foreign matter, chipping).

As described above, when the difference in color between a defective portion (e.g., foreign matter, chipping) and a non-defective portion is small (close in color), anomaly detection with use of the color reflection image is difficult. In this example, the defective portions (foreign matter, chipping) are somewhat unclear in the images Q2 and Q3 (color reflection images). This makes it difficult to detect the defects. In contrast, in the images R2 and R3 (normal images), defective portions are clarified as a raised portion (adhesion of foreign matter) and a recessed portion (chipping). As a result, in the images S2 and S3, the defective portions were successfully detected through the heat map.

Thus, it is possible to use a normal image to determine the appearance of an object OB of determination. A normal image, which represents information on irregularities present on an object OB of determination, allows detective portions to be detected as irregularities even if the defective portions and the non-defective portion are close in color. Further, when both a color reflection image and a normal image are used, a defective portion can be detected more reliably.

As described above, in the present embodiment, whether the object OB of determination is conforming or nonconforming is determined in accordance with at least one selected from the group consisting of the color reflection image of the object OB of determination and the normal image of the object OB of determination.

The present invention is not limited to the embodiments, but can be altered by a skilled person in the art within the scope of the claims. The present invention also encompasses, in its technical scope, any embodiment derived by combining technical means disclosed in differing embodiments.

The invention claimed is:

1. An appearance determination device comprising at least one processor,
the at least one processor carrying out a determination step of determining whether an object of determination is conforming or nonconforming, in accordance with a normal image generated by photometric stereo and representing a distribution of normal directions on a surface of the object of determination,
the normal image being generated by the at least one processor carrying out the following steps (1) to (6):
(1) acquiring a plurality of images of the object of determination irradiated with light emitted from each of a plurality of light sources of respective orientations different from each other, the plurality of images each being taken with use of light containing light of a first wavelength band, light of a second wavelength band, and light of a third wavelength band, wherein the first wavelength band, the second wavelength band, and the third wavelength band are different from each other;
(2) extracting, from the plurality of images, a plurality of first images corresponding to the first wavelength band, a plurality of second images corresponding to the second wavelength band, and a plurality of third images corresponding to the third wavelength band;
(3) determining a first distribution of normal directions on the surface of the object of determination, in accordarce with the plurality of first images;
(4) determining a second distribution of normal directions on the surface of the obiect of determination, in accordance with the plurality of second images;
(5) determining a third distribution of normal directions on the surface of the object of determination, in accordance with the plurality of third images; and
(6) averaging the normal directions in the first distribution, the second distribution, and the third distribution.

2. The appearance determination device according to claim 1, wherein
the at least one processor carries out the steps of:
generating, in accordance with the plurality of first images, a first reflection image representing a distribution of reflectances on the surface of the object of determination;
generating, in accordance with the plurality of second images, a second reflection image representing a distribution of reflectances on the surface of the object of determination;
generating, in accordance with the plurality of third images, a third reflection image representing a distribution of reflectances on the surface of the object of determination; and
compositing the first reflection image, the second reflection image, and the third reflection image to generate a color image, representing a color optical image of the object of determination, and
in the determination step, the at least one processor determines whether the object of determination is conforming or nonconforming, in accordance with the normal image and the color image.

3. The appearance determination device according to claim 1, wherein the at least one processor carries out the step of determining respective orientations of the plurality of light sources, and generates the color image and the shape image in the generation step, in accordance with the plurality of images and the orientations determined.

4. The appearance determination device according to claim 3, wherein
the at least one processor carries out, in the step of determining the respective orientations of the plurality of light sources, the steps of:
determining a plurality of values of an orientation of a light source of the plurality of light sources, in accordance with a plurality of images of a reference object irradiated with light emitted from the light source;
removing a value from the plurality of values, the value deviating by a predetermined value or more from an average of the plurality of values; and
determining the orientation of the light source in accordance with the plurality of values excluding the value deviating by the predetermined value or more.

5. The appearance determination device according to claim 1, wherein the object of determination is a casting.

6. The appearance determination device according to claim 1, wherein
the at least one processor carries out, in the determination step, the steps of:
inputting at least one selected from the group consisting of the color image and the shape image to a neural network model to which features of the object of determination that is a conforming item are mapped, to acquire a score based on at least one feature value of an intermediate layer, or a heat map in which a plurality of scores based on feature values of the intermediate layer are assigned respective segments; and determining whether the object of determination is conforming or nonconforming, in accordance with the score acquired or the heat map acquired.

7. The appearance determination device according to claim 6, wherein in the determination step, the at least one processor determines that the object of determination is a conforming item when the score is smaller than a predetermined threshold, and determines that the object of determination is a defective item when the score is equal to or greater than the predetermined threshold, or determines that the object of determination is a conforming item when the segments of the plurality of scores each of which is equal to or greater than a given value cover an area which is smaller than a predetermined threshold, and determines that the object of determination is a defective item when the segments of the scores each of which is equal to or greater than the given value cover an area which is equal to or greater than the predetermined threshold.

8. The appearance determination device according to claim 1, wherein the at least one processor carries out, in the determination step, the steps of:

inputting at least one selected from the group consisting of the color image of the object of determination and the shape image of the object of determination to an image recognition neural network model for detecting a defect of the object of determination, to acquire a recognition result; and determining whether the object of determination is conforming or nonconforming, in accordance with the recognition result acquired.

9. An appearance determination method comprising the steps of:

inputting a normal image generated by photometric stereo and representing a distribution of normal directions on a surface of an object of determination; and determining whether the object of determination is conforming or nonconforming, in accordance with the normal image, the normal image being generated by carrying out the following steps (1) to (6):

(1) acquiring a plurality of images of the object of determination irradiated with light emitted from each of a plurality of light sources of respective orientation different from each other, the plurality of images each being taken with use of light containing light of a first wavelength band, light of a second wavelength band, and light of a third wavelength band, wherein the first wavelength band, the second wavelength band, and the third wavelength band are different from each other;

(2) extracting, from the plurality of images, a plurality of first images corresponding to the first wavelength band, a plurality of second images corresponding to the second wavelength band, and a plurality of third images corresponding to the third wavelength band;

(3) determining a first distribution of normal direction on the surface of the object of determination, in accordance with the plurality of first images;

(4) determining a second distribution of normal directions on the surface of the object of determination, in accordance with the plurality of secord images;

(5) determining a third distribution of normal directions on the surface of the object of determination, in accordance with the plurality of third images; and (6) averaging the normal directions in the first distribution, the second distribution, and the third distribution.

* * * * *